US012693787B2

(12) United States Patent
Vankamamidi et al.

(10) Patent No.: US 12,693,787 B2
(45) Date of Patent: Jul. 28, 2026

(54) MANAGING SOLID STATE DEVICE (SSD) WEAR-LEVEL

(71) Applicant: Dell Products L.P., Round Rock, TX (US)

(72) Inventors: Vamsi K. Vankamamidi, Hopkinton, MA (US); Geng Han, Beijing (CN); Chun Ma, Beijing (CN)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 18/794,041

(22) Filed: Aug. 5, 2024

(65) Prior Publication Data

US 2026/0037138 A1     Feb. 5, 2026

(51) Int. Cl.
*G06F 3/06* (2006.01)

(52) U.S. Cl.
CPC .......... *G06F 3/0616* (2013.01); *G06F 3/0635* (2013.01); *G06F 3/0688* (2013.01)

(58) Field of Classification Search
CPC ..... G06F 3/0616; G06F 3/0635; G06F 3/0688
See application file for complete search history.

(56) References Cited

U.S. PATENT DOCUMENTS

| | | | |
|---|---|---|---|
| 9,092,337 | B2 | 7/2015 | Nellans et al. |
| 9,195,588 | B2 * | 11/2015 | Cepulis ................. G06F 3/0644 |
| 10,082,965 | B1 | 9/2018 | Tamilarasan et al. |
| 10,521,302 | B1 | 12/2019 | Gao et al. |
| 2017/0147237 | A1 * | 5/2017 | Fang ..................... G06F 11/008 |
| 2019/0129644 | A1 | 5/2019 | Gao et al. |
| 2019/0129647 | A1 | 5/2019 | Gong et al. |
| 2019/0155692 | A1 | 5/2019 | Gao et al. |
| 2020/0026439 | A1 | 1/2020 | Gao et al. |
| 2020/0026468 | A1 | 1/2020 | Kang et al. |
| 2020/0133494 | A1 | 4/2020 | Li et al. |
| 2020/0133514 | A1 | 4/2020 | Xu et al. |
| 2020/0133852 | A1 * | 4/2020 | Lv ....................... G06F 12/0646 |
| 2021/0342085 | A1 | 11/2021 | Kang et al. |

* cited by examiner

*Primary Examiner* — Eric Cardwell
(74) *Attorney, Agent, or Firm* — BainwoodHuang

(57) ABSTRACT

A technique manages solid state device (SSD) wear-level. The technique involves storing data on a plurality of SSDs. The technique further involves, based on storing the data on the plurality of SSDs, identifying a particular SSD of the plurality of SSDs as a target SSD. The technique further involves moving write-hot data to the particular SSD identified as the target SSD to increase writing workload on the particular SSD compared to respective writing workloads on other SSDs of the plurality of SSDs. Accordingly, the particular SSD wears out ahead of the other SSDs and avoids multiple SSD failures at the same time which otherwise could result in data unavailability (DU) and/or data loss (DL).

20 Claims, 5 Drawing Sheets

500

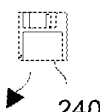

240

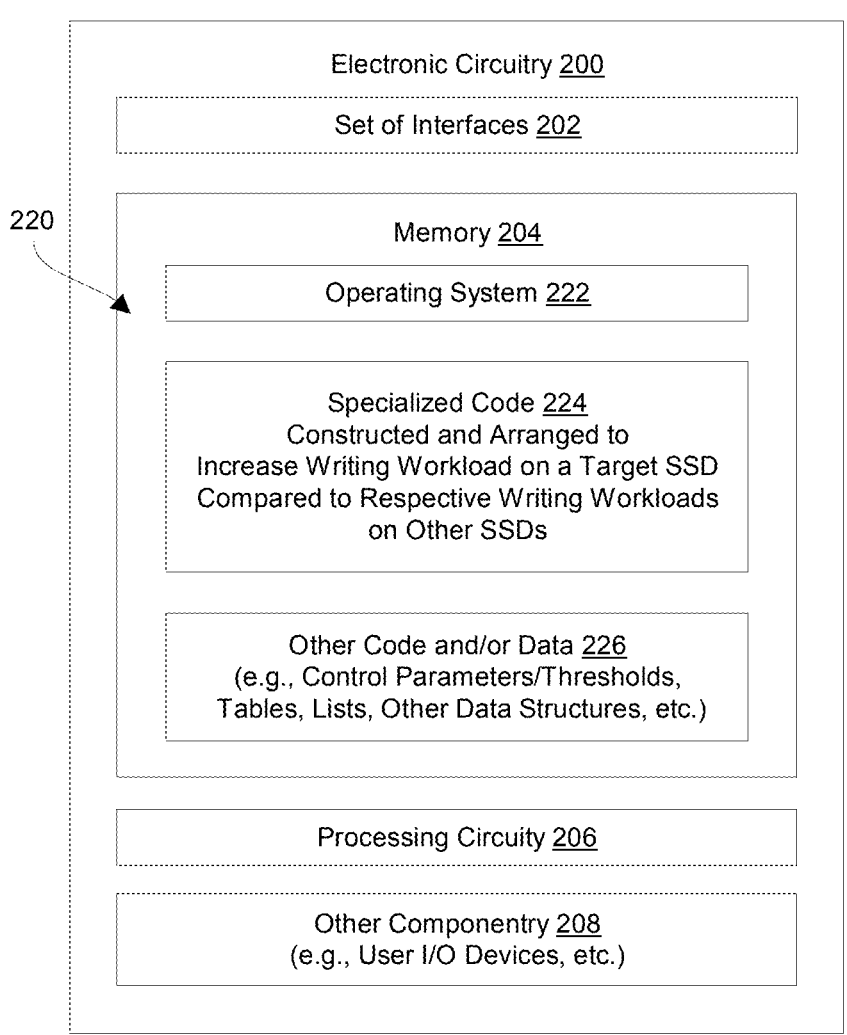

Electronic Circuitry 200

Set of Interfaces 202

220

Memory 204

Operating System 222

Specialized Code 224
Constructed and Arranged to
Increase Writing Workload on a Target SSD
Compared to Respective Writing Workloads
on Other SSDs Other Code and/or Data 226
(e.g., Control Parameters/Thresholds,
Tables, Lists, Other Data Structures, etc.)

Processing Circuity 206

Other Componentry 208
(e.g., User I/O Devices, etc.)

FIG. 2

MANAGING SOLID STATE DEVICE (SSD) WEAR-LEVEL

BACKGROUND

Conventional data storage systems include storage processors (SPs) and storage devices. The SPs process input/output (I/O) requests from hosts by storing data into and loading data from the storage devices.

Storage devices such as solid state drives support a limited number of writes (a limited number of program/erase cycles). To minimize latency and maximize the useful life of the solid state drives, the SPs of the conventional data storage systems attempt to evenly distribute writes among the solid state drives thus wearing the solid state drives uniformly.

SUMMARY

Unfortunately, there are deficiencies to the above-described conventional data storage systems which attempt to evenly distribute writes among solid state drives. For example, evenly distributing writes among the solid state drives encourages the solid state drives to wear out simultaneously. However, such simultaneous wearing out increases the likelihood of the data storage systems encountering multiple solid state drive failures at the same time resulting in undesirable data unavailability (DU) and/or data loss (DL).

Moreover, the solid state drives from some manufacturers may even be configured stop servicing requests entirely once the solid state drives reach a certain amount of wear. For example, certain solid state drives may stop servicing write requests once the amount of wear reaches 105% of the wear life specified by the manufacturer. Unfortunately, if the system has multiple solid state drives reach this critical wear state, the system may encounter DU/DL.

In contrast to a conventional storage system which attempts to evenly distribute writes among solid state drives increasing the risk of encountering multiple solid state drive failures at the same time, an improved technique involves managing solid state device (SSD) wear-level to increase writing workload on a target SSD compared to respective writing workloads on other SSDs. Such an increase in writing workload on the target SSD (perhaps after a period of time in which the writing workload was distributed evenly among SSDs) may be effectuated by placing write-hot data on the target SSD (e.g., swapping the write-hot data into the target SSD in place of write-cold data, storing the write-hot data in a set of spare storage slices of the target SSD, combinations thereof, etc.). In response, the target SSD wears out faster than other SSDs and ultimately fails (or reaches its end of life) ahead of the other SSDs due to higher wear level compared to the other SSDs. Such operation may offer a user an extended (or budgeted) period of time to replace the target SSD before a subsequent SSD failure occurs.

One embodiment is directed to a method of managing SSD wear-level. The method includes storing data on a plurality of SSDs. The method further includes, based on storing the data on the plurality of SSDs, identifying a particular SSD of the plurality of SSDs as a target SSD. The method further includes moving write-hot data to the particular SSD identified as the target SSD to increase writing workload on the particular SSD compared to respective writing workloads on other SSDs of the plurality of SSDs.

Another embodiment is directed to data storage equipment which includes memory, and control circuitry coupled to the memory. The memory stores instructions which, when carried out by the control circuitry, cause the control circuitry to perform a method of:

(A) storing data on a plurality of SSDs, (B) based on storing the data on the plurality of SSDs, identifying a particular SSD of the plurality of SSDs as a target SSD, and (C) moving write-hot data to the particular SSD identified as the target SSD to increase writing workload on the particular SSD compared to respective writing workloads on other SSDs of the plurality of SSDs.

Yet another embodiment is directed to a computer program product having a non-transitory computer readable medium which stores a set of instructions to manage SSD wear-level. The set of instructions, when carried out by computerized circuitry, causes the computerized circuitry to perform a method of:

(A) storing data on a plurality of SSDs;

(B) based on storing the data on the plurality of SSDs, identifying a particular SSD of the plurality of SSDs as a target SSD; and (C) moving write-hot data to the particular SSD identified as the target SSD to increase writing workload on the particular SSD compared to respective writing workloads on other SSDs of the plurality of SSDs.

In some arrangements, the wear levels of all of the SSDs of the plurality of SSDs are initially below a predefined late stage wear level threshold. Additionally, identifying the particular SSD of the plurality of SSDs as the target SSD includes:

(i) detecting a SSD aging event in which a wear level of the particular SSD has become greater than the predefined late stage wear level threshold, and (ii) in response to the SSD aging event, designating the particular SSD as the target SSD.

In some arrangements, designating the particular SSD as the target SSD includes selecting the particular SSD among the plurality of SSDs due to the particular SSD having the most aging among the plurality of SSDs.

In some arrangements, moving the write-hot data to the particular SSD includes transferring the write-hot data onto the particular SSD from another SSD of the plurality of SSDs.

In some arrangements, the method further includes, prior to transferring the write-hot data onto the particular SSD from the other SSD, identifying the write-hot data among other data stored on the plurality of SSDs based on write frequency metadata indicating a write frequency metric for the write-hot data.

In some arrangements, transferring the write-hot data onto the particular SSD includes:

(i) identifying a set of write-cold data slices on the particular SSD;

(ii) identifying a set of write-hot data slices on the other SSD;

(iii) storing the identified set of write-hot data slices onto the particular SSD in place of the identified set of write-cold data slices on the particular SSD; and (iv) storing the identified set of write-cold data slices onto the other SSD in place of the identified set of write-hot data slices on the other SSD.

In some arrangements, transferring the write-hot data onto the particular SSD includes:

(i) identifying a set of spare storage slices on the particular SSD;

(ii) identifying a set of write-hot data slices on the other SSD; and (iii) relocating the identified set of write-hot data slices from the other SSD onto the identified set of spare storage slices on the particular SSD.

In some arrangements, the method further includes, after the write-hot data is transferred onto the particular SSD, computing wear level differences between the particular SSD and the other SSDs of the plurality of SSDs.

In some arrangements, the method further includes, in response to one of the computed wear level differences between the particular SSD and the other SSD of the plurality of SSDs exceeding a predefined termination threshold, removing the write-hot data from the particular SSD to reduce writing workload on the particular SSD.

In some arrangements, the method further includes, while wear levels of all of the SSDs of the plurality of SSDs are initially below a predefined late stage wear level threshold, computing wear level differences among the SSDs of the plurality of SSDs.

In some arrangements, identifying the particular SSD of the plurality of SSDs as the target SSD includes:

(i) while the wear levels of all of the SSDs of the plurality of SSDs are still initially below the predefined late stage wear level threshold, detecting a SSD deviation event in which a wear level of the particular SSD and another SSD of the plurality of SSDs has become greater than a predefined initiation threshold, and (ii) in response to the SSD deviation event, designating the particular SSD as the target SSD.

In some arrangements, designating the particular SSD as the target SSD includes selecting the particular SSD among the plurality of SSDs due to the particular SSD having the least aging among the plurality of SSDs.

In some arrangements, moving the write-hot data to the particular SSD includes transferring the write-hot data onto the particular SSD from the other SSD of the plurality of SSDs.

In some arrangements, transferring the write-hot data onto the particular SSD includes:

(i) identifying a set of write-cold data slices on the particular SSD;

(ii) identifying a set of write-hot data slices on the other SSD;

(iii) storing the identified set of write-hot data slices onto the particular SSD in place of the identified set of write-cold data slices on the particular SSD; and (iv) storing the identified set of write-cold data slices onto the other SSD in place of the identified set of write-hot data slices on the other SSD.

In some arrangements, transferring the write-hot data onto the particular SSD includes:

(i) identifying a set of spare storage slices on the particular SSD;

(ii) identifying a set of write-hot data slices on the other SSD; and (iii) relocating the identified set of write-hot data slices from the other SSD onto the identified set of spare storage slices on the particular SSD.

In some arrangements, the method further includes, after the write-hot data is transferred onto the particular SSD, computing further wear level differences between the particular SSD and the other SSDs of the plurality of SSDs.

In some arrangements, the method further includes, in response to one of the computed further wear level differences between the particular SSD and the other SSD of the plurality of SSDs exceeding a predefined termination threshold, removing the write-hot data from the particular SSD to reduce writing workload on the particular SSD.

It should be understood that, in the cloud context, at least some of the electronic circuitry disclosed herein is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in managing SSD wear-level.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 2 is a block diagram of example electronic circuitry of the data storage environment of FIG. 1 in accordance with certain embodiments.

DETAILED DESCRIPTION

Overview

An improved technique is directed to managing solid state device (SSD) wear-level to increase writing workload on a target SSD compared to respective writing workloads on other SSDs (perhaps after a period of time in which the writing workload was distributed evenly among the SSDs). Such an increase in writing workload on the target SSD may be effectuated by placing write-hot data on the target SSD (e.g., swapping the write-hot data into the target SSD in place of write-cold data, storing the write-hot data in a set of spare storage slices of the target SSD, combinations thereof, etc.). In response to such write-hot data placement, the target SSD wears out faster than other SSDs and ultimately fails (or reaches its end of life) first due to higher wear level compared to the other SSDs. Such operation may offer a user an extended period of time to replace the target SSD before a subsequent SSD failure occurs and otherwise result in a data unavailability (DU) and/or data loss (DL) situation.

Figure 1:
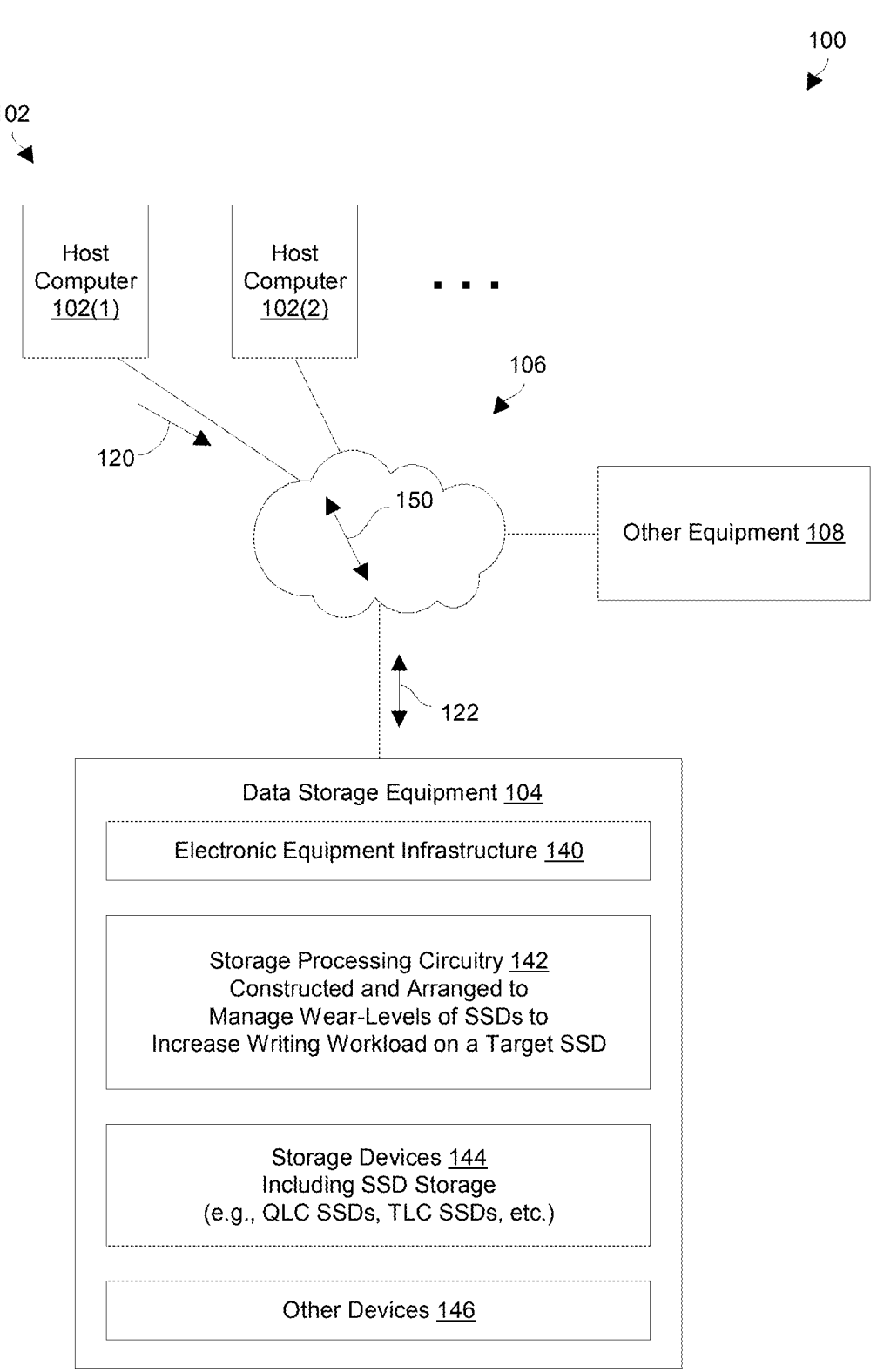
FIG. 1 is a block diagram of a data storage environment in which SSD wear level is managed to increase writing workload on a target SSD compared to respective writing workloads on other SSDs in accordance with certain embodiments.

FIG. 1 shows a data storage environment 100 which manages SSD wear-level to increase writing workload on a target SSD compared to respective writing workloads on other SSDs and thus avoid encountering multiple SSD failures at the same time. The data storage environment 100 includes host computers 102(1), 102(2), . . . (collectively, host computers 102), data storage equipment 104, a communications medium 106, and perhaps other equipment 108.

Each host computer 102 is constructed and arranged to perform useful work. For example, one or more of the host computers 102 may operate as a file server, a web server, an email server, an enterprise server, a database server, a transaction server, combinations thereof, etc. which provides input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to store host data 122 within and/or retrieve host data 122 from storage (e.g., primary storage or main memory, secondary storage, tiered storage, combinations thereof, etc.).

The data storage equipment 104 is an example of electronic equipment that is capable of managing SSD wear-level to increase writing workload on a target SSD. The data storage equipment 104 includes an electronic equipment infrastructure 140, storage processing circuitry 142, storage devices 144 including SSD storage, and other devices 146. Other types of electronic equipment may include one or more of these components and, in accordance with certain embodiments, one or more of the improvements disclosed herein is applied to such other types of electronic equipment (e.g., general purpose computing equipment, database equipment, computational equipment, network equipment, specialize equipment, combinations thereof, etc.).

The electronic equipment infrastructure 140 is constructed and arranged to support operation of various components of the data storage equipment 104. To this end, the electronic equipment infrastructure 140 positions the various components relative to each other, conveys power signals from power converters to the various components, positions fans along air pathways to provide cooling to the various components (i.e., to remove heat), protects the various components against tampering, damage, and so on. Along these lines, the electronic equipment infrastructure 140 may include one or more frames or card cages, chassis/housings/cabinets, power supplies/converters, fans, backplanes or midplanes, and so on.

The storage processing circuitry 142 is constructed and arranged to respond to the I/O requests 120 received from the host computers 102 by writing data into the set of storage devices 144 and/or reading the data from the storage devices 144. The storage processing circuitry 142 may include one or more physical storage processing modules or engines, data movers, director boards, blades, etc. In accordance with certain embodiments, the storage processing circuitry 142 may include a variety of specialized subcomponents such as processing circuitry to process the I/O requests 120 from the host computers 102, cache memory to operate as read and/or write caches, on-board NICs to provide communications between the storage processing circuitry 142 and/or external devices, LEDs, switches for local I/O, and so on.

The storage devices 144 are constructed and arranged to store data within the data storage equipment 104. In accordance with certain embodiments, the storage devices 144 may arrange the data in accordance with one or more data protection schemes (e.g., RAID1, RAID5, RAID6, RAID10, etc.). Example storage devices 144 include RAM devices, NVRAM devices, other solid state memory devices (SSDs), hard disk drives (HDDs), combinations thereof, and so on.

As will be explained in further detail shortly, the storage processing circuitry 142 manages wear-levels of SSDs of the storage devices 144 to increase writing workload on a target SSD. Such wear-level management wears out the target SSD ahead of the other SSDs thus avoiding encountering concurrent SSD failures.

In accordance with certain embodiments, the storage processing circuitry 142 organizes storage space from the storage devices 144 into storage extents called "UBERs." The UBERs include drive sections (or "drive slices") from multiple storage devices 144 according to a particular RAID scheme (e.g., RAID5, RAID6, etc.). Along these lines, some slices on some storage devices 144 may store regular data and other slices on other storage devices 144 may store parity to form a RAID structure in accordance with a particular data protection scheme (e.g., four slices containing regular data and two slices containing parity in accordance with RAID6 (4+2), etc.).

As just mentioned, at least some of the storage devices 144 are SSDs which perform periodic refreshes. Example SSDs include multi-level cell (MLC) SSDs such as quad-level cell (QLC) SSDs, triple-level cell (TLC) SSDs, combinations thereof, and so on. Such SSDs require periodic refreshes in which data is internally read from one erase block and written to another erase block at refresh intervals in order to prevent data loss due to weakened cell charge and thus increases SSD wear.

In accordance with certain embodiments, the SSDs provide drive slices from which the UBERs are constructed. Such UBERs organize the drive slices into log-structured storage in accordance with a storage protection scheme such as RAID5 or RAID6 (e.g., a RAID group or tier of SSDs). As such, the storage processing circuitry 142 provides an external system-level garbage collection service which is constructed and arranged to consolidate valid data among the SSDs. Additionally, the SSDs may perform internal garbage collection (e.g., perhaps contemporaneously during refresh) to consolidate valid data within the SSDs. Such garbage collection processes increase SSD wear.

The other devices 146 of the data storage equipment 104 are constructed and arranged to provide supporting features. Along these lines, the other devices 146 may include a set of communications interfaces (e.g., a set of discrete network interface controllers or NICs) that provide communications for the data storage equipment 104, a user interface for local user access, backup power sources, and so on.

The communications medium 106 is constructed and arranged to connect the various components of the data storage environment 100 together to enable these components to exchange electronic signals 150 (e.g., see the double arrow 150). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other equipment 108 represents other possible componentry of the data storage environment 100. Along these lines, the other equipment 108 may include remote data storage equipment that provides data to and/or receives data from the data storage equipment 104 (e.g., replication arrays, backup and/or archiving equipment, external service processors and/or other management/control devices, etc.).

During operation, the data storage equipment 104 processes I/O requests 120 from the set of host computers 102 to perform useful work. In particular, the storage processing circuitry 142 writes host data 122 into and retrieves host data 122 from the storage devices 144 in response to the I/O requests 120.

During such operation and in accordance with certain embodiments, the storage processing circuitry 142 performs log structured writes on the SSD storage. Additionally, the storage processing circuitry 142 performs system-level garbage collection to reclaim unused storage space within the SSD storage (e.g., by consolidating valid data into fewer erase blocks to free up erase blocks for future use).

It should be appreciated that, during such operation, the SSD storage may perform internal operations to manage data as well. Along these lines, the SSD storage may perform internal garbage collection, erase block periodic refreshes at a periodic refresh interval, and so on. In some arrangements, the SSD storage performs internal garbage collection and periodic refreshes together (i.e., simultaneously as an advanced operation).

Unfortunately, if left unmanaged or if improperly managed, write operations impose wear on the SSD storage and thus reduce (or consume) the lifetime of the SSD storage in a manner that could result in multiple SSD failures (e.g., in which multiple SSDs reach the ends of their lives) at the same time. However, as will be explained in further detail below, the storage processing circuitry 142 is able to move write-hot data to a particular SSD, which is identified as the target SSD, to increase writing workload on the particular SSD compared to respective writing workloads on other SSDs of the plurality of SSDs. Such placement wears out the target SSD faster than the other SSDs to enable the data storage equipment 104 to encounter an SSD failure in which the target SSD wears out first ahead of the other SSDs and then effectuate a replacement of the target SSD before encountering another SSD failure. Since such operation avoids encountering multiple SSD failures at the same time, the data storage equipment 104 is better protected against DU/DL.

It should be understood that the term "SSD failure" as used herein simply refers to the SSD reaching its end of life. There is no requirement that the SSD actually encounter a malfunction. Further details will now be provided with reference to FIG. 2.

FIG. 2 is a block diagram of electronic circuitry 200 which is suitable for at least a portion of the data storage equipment 104 in accordance with certain embodiments (also see FIG. 1). The electronic circuitry 200 includes a set of interfaces 202, memory 204, processing circuitry 206, and other componentry (or circuitry) 208.

The set of interfaces 202 is constructed and arranged to connect the electronic circuitry 200 to the communications medium 106 (FIG. 1) to enable communications with other devices of the data storage environment 100. Such communications may be IP-based, SAN-based, cellular-based, cable-based, fiber-optic based, wireless, cloud-based, combinations thereof, and so on. Additionally, the set of interfaces 202 is constructed and arranged to connect the electronic circuitry 200 to other local equipment. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., solid state memory, magnetic memory, etc.). The memory 204 stores a variety of software constructs 220 including an operating system 222, specialized code 224, and other code and data 226. The operating system 222 refers to particular control code such as a kernel to manage computerized resources (e.g., processor cycles, memory space, etc.), the I/O stack (e.g., drivers), and so on. The specialized code 224 refers to particular instructions and/or other software constructs for, among other things, managing SSD wear-level to increase writing workload on a target SSD compared to respective writing workloads on other SSDs and thereby avoid encountering multiple SSD failures at the same time. The other code and data 226 refers to control parameters/thresholds, tables, lists, other data structures, routines, combinations thereof, and so on.

The processing circuitry 206 is constructed and arranged to operate in accordance with the various software constructs 220 stored in the memory 204. Along these lines, the processing circuitry 206 may execute the specialized code 224 to form specialized circuitry that robustly and reliably enables the electronic circuitry 200 to increase writing workload on a target SSD compared to respective writing workloads on other SSDs. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include specialized equipment such as a local user I/O circuitry, circuitry for fault tolerance, etc. Further details will now be provided with reference to FIGS. 3 and 4.

Influencing the Wear-Out Process on a Particular Drive

Figure 3:
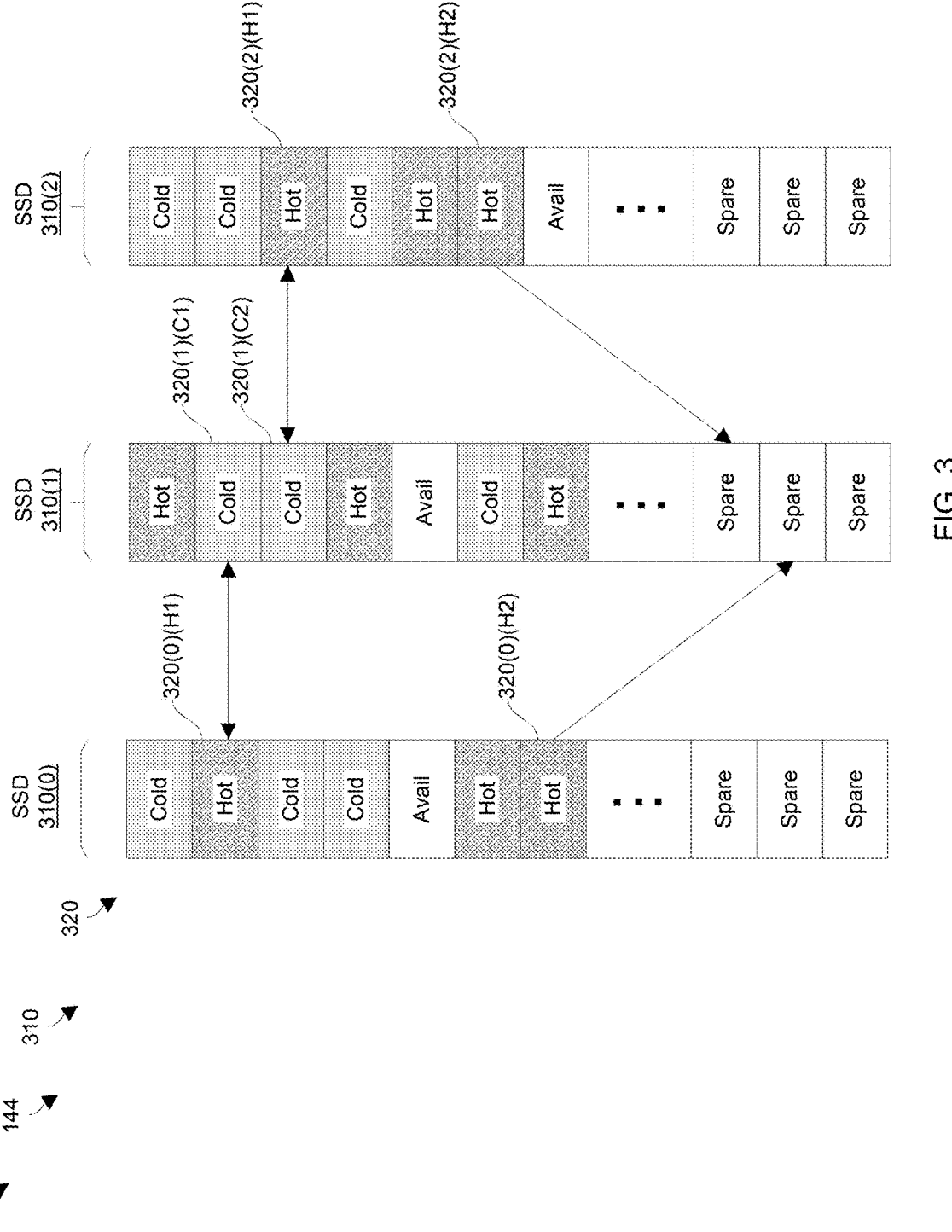
FIG. 3 is a block diagram of a set of SSDs in which a write workload on a target SSD is increased so that the target SSD wears out faster than other SSDs in accordance with certain embodiments.
Figure 4:
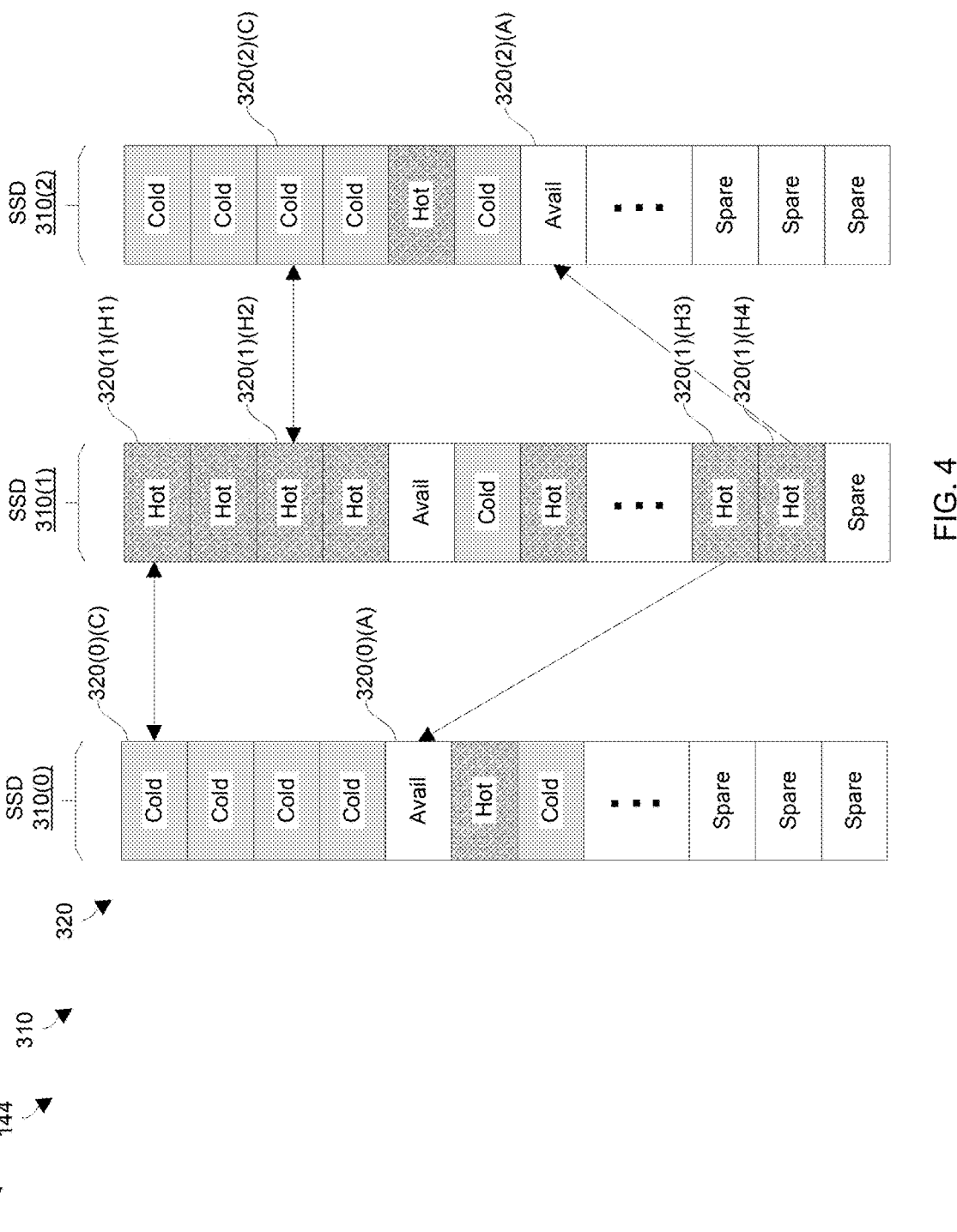
FIG. 4 is a block diagram of the set of SSDs in which the write workload on the target SSD is reduced so that the target SSD no longer wears out faster than other SSDs in accordance with certain embodiments.

FIGS. 3 and 4 provide certain details involving influencing the wear out process on a particular storage device 144 among storage devices 144 in accordance with certain embodiments. FIG. 3 shows a view 300 of a set of SSDs 310(0), 310(1), 310(2) (collectively, SSDs 310) in which a write workload on a target SSD 310(1) is increased (i.e., wear acceleration) so that the target SSD 310(1) wears out faster than other SSDs 310. FIG. 4 shows a view 400 of the set of SSDs 310 in which the write workload on the target SSD 310(1) is reduced so that the target SSD 310(1) no longer wears out as fast.

As mentioned earlier in connection with FIG. 1, the storage devices 144 include SSD storage. Such SSD storage may be, at least in part, formed by the set of SSDs 310 (see FIG. 3). By way of example only, there are three SSDs 310(0), 310(1), and 310(2) that are shown, but it should be appreciated that other numbers of SSDs are suitable for use (e.g., two, four, five, and so on).

In accordance with certain embodiments, slices 320 from these SSDs 310 may form part of a larger storage structure which is referred to as an UBER. Along these lines, the number of slices 320 used to form a RAID structure for the UBER may depend on the particular RAID protection scheme employed by the UBER (e.g., RAID5 (4+1), RAID5 (8+1), RAID6 (4+2), and so on). Moreover, the total number of SSDs 310 that are used to form the UBER may be from a pool of SSDs 310 (e.g., a pool of 16 SSDs, 25 SSDs, etc.) in accordance with a mapped-RAID architecture.

Additionally, it should be appreciated that the slices 320 may be used for various purposes. Along these lines, some slices 320 may be designated for storing data and other slices 320 may be designed as spares for use in data recovery. The slices 320 that are designated as spares are labeled "Spare" in FIGS. 3 and 4. The other slices 320 that are not labeled as "Spare" in FIGS. 3 and 4 are designated for storing data.

Among the slices 320 that are designated for storing data, specialized circuitry of the data storage equipment 104 (e.g., the storage processing circuitry 142 in FIG. 1) may monitor/track usage of the slices 320 to determine whether the slices 320 store write-hot data (data which is frequently written and labeled as "Hot" in FIG. 3) or write-cold data (data which is infrequently written and labeled as "Cold" in FIG. 3). Examples of data that is frequently written include contents of documents that are regularly edited, periodically updated status/code/etc. that supports running applications, parameters which routinely vary for algorithms, and the like. Examples of data that is infrequently written include static documents, saved pictures/movies, transaction histories, old versions of files, and the like.

It is also possible that some slices 320 that are designated for storing data do not currently hold any data but are ready or available for use (labeled as "Avail" in FIG. 3). Such available slices 310 made have been previously used but are now made available (e.g., in response to garbage collection, in response to deletion of files, etc.).

During the early stages of the SSDs 310 (e.g., when the SSDs 310 are relatively new and not very worn), the specialized circuitry of the data storage equipment 104 manages SSD wear in a regular manner by distributing the write-hot data evenly among the SSDs 310. Such operation load balances data writing among the SSDs 310 thus minimizing bottlenecks and reducing latency for optimal runtime performance.

During this time, the specialized circuitry of the data storage equipment 104 monitors respective wear-level metrics for the SSDs 310. Such wear level metrics indicate how much useful life remains in the SSDs 310 and may be represented a variety of ways such as the numbers of program/erase (P/E) cycles performed by the SSDs 310 thus far, the numbers of P/E cycles remaining for the SSDs 310, the percentage of useful life of the SSDs 310 consumed, the percentage of useful life of the SSDs 310 remaining, combinations thereof, etc. Other units are suitable for the SSD wear-level metrics as well.

In some arrangements, the SSDs 310 internally maintain such wear-level metrics and provide them to the specialized circuitry upon request (e.g., in response to SCSI queries). In some arrangements, the specialized circuitry externally maintains such wear-level metrics as metadata (e.g., see the other code and data 226 in FIG. 2). In some arrangements, such metrics are maintained internally and externally.

Additionally, the specialized circuitry of the data storage equipment 104 maintains respective write frequency metrics for the data within the slices 320 of the SSDs 310 (e.g., see the other code and data 226 in FIG. 2). Such write frequency metrics indicate how frequently the data within the slices 320 is written. Along these lines, it should be appreciated that some data is rarely updated while other data is updated often. Examples write frequency metrics include writes/week, writes/day, writes/hour, etc. for the slices 320 of the SSDs 310.

Moreover, if the write frequency metric for particular data in a slice 320 is above a predefined threshold, the specialized circuitry considers the particular data to be write-hot data. However, if the write frequency metric for particular data in the slice 320 is below the predefined threshold, the specialized circuitry considers the particular data to be write-cold data.

It should be appreciated that the write frequency metrics apply to the data stored within the slices 320 rather than the slices 320 themselves since the slices 320 are storage locations for the data. Along these lines, data which is written more frequently will impose more write stress on an SSD 310 than data which is written less frequently.

It further should be appreciated that when the distribution of write-hot data and write-cold data among the SSDs 310 is generally even, the SSDs 310 will wear at roughly the same rate. As a result, the SSDs 310 will likely reach the ends of their useful lives and fail at the same time. Unfortunately, such a situation could result in DU/DL.

In accordance with certain embodiments, the specialized circuitry detects when a transition occurs and the SSDs 310 are no longer in their early stages but instead have entered their later stages. Along these lines, the specialized circuitry considers the SSDs 310 to have entered their later stages once one of the SSDs 310 has a wear lever that exceeds a predefined wear-level threshold, e.g., an early/late stage wear-level threshold. Such detection may be made by periodically comparing the respective wear-level metrics for the SSDs 310 to this predefined wear-level threshold.

Suppose that the early/late stage wear-level threshold is a percentage of consumed useful life. Examples include 80% of the useful life, 85%, 90%, etc.

Once there is an SSD 310 with a respective wear-level metric that exceeds the early/late stage wear-level threshold, the specialized circuitry no longer considers the SSDs 310 to be in their early stages. Instead, the specialized circuitry then considers the SSDs 310 to have entered their later stages and deems the SSD 310 with the respective wear-level metric that exceeds the early/late stage wear-level threshold to be a target SSD to undergo wear acceleration.

By way of example, suppose that the specialized circuitry of the data storage equipment 104 detects that wear level of the SSD 310(1) has transitioned from being under the early/late stage wear-level threshold to now exceeding the early/late stage wear-level threshold. Normal writing to the SSD 310(1) may have triggered such an event and, since writing workload to all of the SSDs 310 is generally even, it is likely that the other SSDs 310 have wear levels which are very close to the early/late stage wear-level threshold.

Upon detection that the SSDs 310 have now entered their later stages, the specialized circuitry increases the amount of write-hot data on the target SSD 310(1). Such increasing of write-hot data results in greater write workload on the target SSD 310(1) to accelerate wear of the target SSD 310(1) ahead of the other SSDs 310.

Such increasing of the amount of write-hot data on the target SSD 310(1) may be performed in a variety of ways. Moreover, such increasing may be based on the write frequency metrics for the data within the slices 320 which is maintained by the specialized circuitry of the data storage equipment 104 as mentioned above (e.g., also see the other code and data 226 in FIG. 2).

For example, as shown in FIG. 3, the specialized circuitry may swap write-cold data on the target SSD 310(1) with write-hot data on one or more of the other SSDs 310. Once such swapping is performed, the target SSD 310(1) will wear faster than the other SSDs 310 due to the increased write workload placed on the target SSD 310(1). Along these lines, the specialized circuitry may swap write-cold data currently within the slice 320(1)(C1) of the SSD 310(1) with write-hot data currently within the slice 320(0)(H1) of the SSD 310(0) (also see FIG. 3). Similarly, the specialized circuitry may swap write-cold data currently within the slice 320(1)(C2) of the SSD 310(1) with write-hot data currently within the slice 320(2)(H1) of the SSD 310(2) (FIG. 3).

As another example, as shown in FIG. 3, the specialized circuitry may move write-hot data from one or more of the other SSDs 310 into one or more the slices 310 designated as spares. Again, once such placement is performed, the target SSD 310(1) will wear faster than the other SSDs 310 due to the increased write workload placed on the target SSD 310(1). Along these lines, the specialized circuitry may relocate write-hot data currently within the slice 320(0)(H2) of the SSD 310(0) into a first spare slice 320 of the target SSD 310(1) (also see FIG. 3). Similarly, the specialized circuitry may relocate write-hot data currently within the slice 320(2)(H2) of the SSD 310(2) into a second spare slice 320 of the target SSD 310(1) (also see FIG. 3).

Other operations may be performed to increase of the amount of write-hot data on the target SSD 310(1). For example, some write-hot data may be moved from one or more other SSDs 310 to one or more slices 320 of the target SSD 310(1) which are designated for storing data and currently available/unused. In some arrangements, the specialized circuitry selects which data and the amount of data to be moved based on a combination of factors such as respective write frequency metrics for the data, the capacities of the SSDs 310, the number of available slices 320 on the target SSD 310(1), the number of spare slices on the target SSD 310(1), etc. In accordance with certain embodiments, any of the above-described techniques for increasing of the amount of write-hot data on the target SSD 310(1) may be combined (e.g., see FIG. 3).

It should be appreciated that the amount of write-hot data that specialized circuitry moves onto the target SSD 310(1) may vary depending on a variety of factors. Such factors include the values of the write frequency metrics for the write-hot data (e.g., how frequently the write-hot data is updated), the current wear level of the target SSD 310(1) (e.g., how much useful life remains for the target SSD 310(1))), how much time should be made available (or budgeted) between the target SSD 310(1) reaching the end of its useful life and the next SSD 310 reaching the end of its useful life (e.g., two weeks, one month, etc.), combinations thereof, and so on.

It should be appreciated that placing write-cold data onto one of the other SSDs 310 and removing write-hot data from that one of the other SSDs 310 will reduce the rate of wear for that SSD 310. Accordingly, in some arrangements, the specialized circuitry generally reduces the wear workload evenly among the remaining SSDs 310 to enable the remaining SSDs 310 age at relatively the same rate and slower than the rate for the target SSD 310(1).

While the SSDs 310 are in the later stages, the specialized circuitry of the data storage equipment 104 continues to monitor wear levels of the SSDs 310 and manage wear among the SSDs 310. In particular, when the specialized circuitry detects that the wear level of the target SSD 310(1) reaches another predefined wear level threshold, e.g., a nearing-end-of-life wear-level threshold, the specialized circuitry reduces the wear rate of the target SSD 310(1). To this end, the specialized circuitry periodically compares the wear levels of the SSDs 310 to the nearing-end-of-life wear-level threshold to detect when the wear level of the target SSD 310(1) exceeds the nearing-end-of-life wear-level threshold. In some arrangements, such reduction rebalances the rate of wear among all of the SSDs 310 thereby normally stressing on the SSDs 310 even though the target SSD 310(1) will clearly reach its end of life ahead of the other SSDs 310.

When wear level of the target SSD 310(1) exceeds the nearing-end-of-life wear-level threshold, the specialized circuitry decreases of the amount of write-hot data on the target SSD 310(1). Such wear rate reduction may be performed in a variety of ways and may be based on the earlier-mentioned factors such as the write frequency metrics for the data within the slices 320 (e.g., see the other code and data 226 in FIG. 2). Along these lines, the process for reducing the wear rate on the target SSD 310(1) to decrease the write workload on the target SSD 310(1) is essentially the opposite of the process shown in FIG. 3.

For example, as shown in FIG. 4, the specialized circuitry may swap write-hot data on the target SSD 310(1) with write-cold data on one or more of the other SSDs 310. Once such swapping is performed, the target SSD 310(1) will no longer wear faster than the other SSDs 310. Along these lines, the specialized circuitry may swap write-hot data currently within the slice 320(1)(H1) of the SSD 310(1) with write-cold data currently within the slice 320(0)(C) of the SSD 310(0) (also see FIG. 4). Similarly, the specialized circuitry may swap write-hot data currently within the slice 320(1)(H2) of the SSD 310(1) with write-cold data currently within the slice 320(2)(C) of the SSD 310(2) (FIG. 4).

As another example, as shown in FIG. 4, the specialized circuitry may remove write-hot data from one or more slices 320 that were previously designated as spares to one or more other SSDs 310. Once such removal is performed, the target SSD 310(1) will no longer wear as fast due to the decreased write workload on the target SSD 310(1). Along these lines, the specialized circuitry may relocate write-hot data currently within the slice 320(1)(H3) of the SSD 310(1) into an available (or currently unused) slice 320(0)(A) designated for storing data of the SSD 310(0) (also see FIG. 4). Similarly, the specialized circuitry may relocate write-hot data currently within the slice 320(1)(H4) of the SSD 310(1) into an available slice 320(2)(A) designated for storing data of the SSD 310(2) (also see FIG. 4).

Moreover, if the target SSD 310(1) reduced the number of slices 320 that were designated as spares when the write workload on the target SSD 310(1) was increased, the specialized circuitry may increase the number of slices 320 on the target SSD 310(1) which are designated as spares. For example, if any of the slices 320 on the target SSD 310(1) that had write-hot data removed were originally designated as spares, the specialized circuitry may re-designate those slices 320 as spares.

Other operations may be performed to reduce of the amount of write-hot data on the target SSD 310(1). For example, some write-hot data on the target SSD 310(1) may be swapped with write-cold data on one or more other SSDs 310. Moreover, in accordance with certain embodiments, any of the above-described techniques for decreasing of the amount of write-hot data on the target SSD 310(1) may be combined (e.g., see FIG. 4).

In accordance with certain embodiments, when the target SSD 310(1) reaches the nearing-end-of-life wear-level threshold, the specialized circuitry alerts a user (e.g., a human operator) that the target SSD 310(1) is to be replaced and starts a clock (or timer) that expires if the amount of time budgeted for replacement of the target SSD 310(1) expires before the target SSD 310(1) is replaced. Alternatively, the specialized circuitry may alert the user and start the timer after the wear level of the target SSD 310(1) reaches another predefined wear level threshold.

The amount of time for the clock is a budgeted amount of time (e.g., 2 weeks) within which the user is to replace the target SSD 310(1). If there is a delay in the replacement of the target SSD 310(1) and the clock expires, the specialized circuitry automatically imposes a remedial activity such as transitioning one or more of the SSDs 310 forming the SSD storage into a read-only mode to protect the data. Further details will now be provided with reference to FIG. 5.

Further Details

Figure 5:
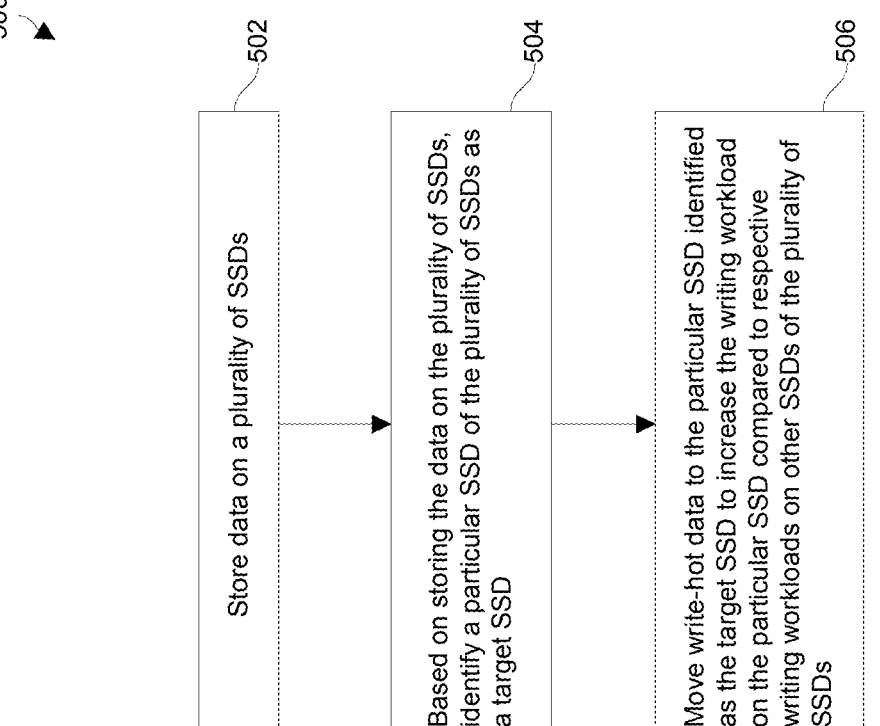
FIG. 5 is a flowchart of a procedure which is performed by the data storage environment of FIG. 1 in accordance with certain embodiments.

FIG. 5 is a flowchart of a procedure 500 which is performed by specialized circuitry to manage SSD wear-level. Such specialized circuitry may reside within storage processing circuitry that processes I/O requests from a set of host computers (e.g., also, see FIG. 1).

At 502, the specialized circuitry stores data on a plurality of SSDs. Along these lines, the plurality of SSDs may have writing workload evenly distributed to optimize performance while in the early stages (e.g., to minimize write latency).

At 504, the specialized circuitry identifies, based on storing the data on the plurality of SSDs, a particular SSD of the plurality of SSDs as a target SSD. For example, the specialized circuitry may monitor wear levels of the SSDs and detect when a first one of the plurality of SSDs has its wear level exceed a predefined threshold.

At 506, the specialized circuitry moves write-hot data to the particular SSD identified as the target SSD to increase writing workload on the particular SSD compared to respective writing workloads on other SSDs of the plurality of SSDs. Here, the specialized circuitry may swap write-hot data on other SSDs with write-cold data on the particular SSD identified as the target SSD. Additionally or alternatively, the specialized circuitry may move write-hot data on other SSDs into memory on the target SSD which is reserved (e.g., slices designated as spares for data recovery). At this point, the SSDs are no longer in the early stages but have now entered the later stages.

With the process 500 as described above, the specialized circuitry is able to efficiently and effectively increase write stressing of the target SSD to encourage the target SSD to reach end of life earlier than other SSDs. Accordingly, there is less likelihood of encountering multiple SSDs failures at the same time thus avoiding DU/DL and improving data protection.

At some point, the additional write stressing placed on the target SSD may be removed. Along these lines, if the wear level of the target SSD is sufficiently higher than the wear level of the other SSDs (e.g., by 2%, by 3%, etc.), the amount of write-hot data on the target SSD may be reduced.

Here, the specialized circuitry may monitor the wear level of the target SSD and automatically decide to decrease the writing workload on the target SSD when the wear level of the target SSD reaches a predefined threshold (e.g., a near-ing-end-of-life wear-level threshold). In some arrangements, the difference in wear level between the target SSD and the other SSDs which is used to trigger lowering of the writing workload on the target SSD is based on the desired amount of time between the target SSD reaching end of life and the next SSD of the plurality of SSDs reaching end of life (e.g., two weeks, one month, two months, etc.).

As described above, improved techniques are directed to managing SSD wear-level to increase writing workload on a target SSD 310 compared to respective writing workloads on other SSDs 310. Such an increase in writing workload on the target SSD 310 may be effectuated by placing write-hot data on the target SSD 310 (e.g., swapping the write-hot data into the target SSD 310 in place of write-cold data, storing the write-hot data in a set of spare storage slices of the target SSD 310, combinations thereof, etc.). In response, the target SSD 310 wears out faster than other SSDs 310 and ultimately fails first due to higher wear level compared to the other SSDs 310. Such operation may offer a user an extended period of time to replace the target SSD 310 before a subsequent SSD failure occurs.

One should appreciate that the above-described techniques do not merely collect and store data. Rather, the disclosed techniques involve improvements to data storage technology. With the techniques, storage equipment is able to advantageously avoid concurrent SSD failures which could otherwise cause DU/DL. Moreover, such wear control may enable the amount of time between SSDs reaching end of life to provide sufficient time (e.g., with margin for error) for SSDs to be replaced before the next SSDs reach their end of lives.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 100 such as the host computers 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

In accordance with certain views, beyond random hardware problems, SSD drive failures are primarily driven by high wear levels. Once the wear on an SSD exceeds a certain threshold, the data safety on that drive is no longer guaranteed. This wear threshold can vary across different SSD vendors.

Some SSD models may even stop servicing requests entirely once the wear level crosses a certain point, such as 105%. If a system has multiple drives reach this critical wear state, it can lead to data unavailability (DU) or even a data loss (DL) event for the user or operator.

In accordance with certain embodiments, storage equipment is proactively prevented from reaching this problematic high-wear state in the first place. This would allow avoiding the potential data availability and data loss issues that can arise when multiple drives simultaneously exceed their wear thresholds.

Along these lines, there is a wear-level management process to reduce data loss risk on the storage equipment. Along these lines, specialized circuitry stresses a target drive with more writing workload. Additionally, such stresses enables managing of wear by wearing out a target drive faster than others via adding more writing workload to those drives.

In accordance with certain embodiments, if all drives have wear levels below a predefined threshold WL-1 (e.g., 80%), no action is taken, and the system operates as it does currently. In such a situation, the drives may be viewed as being in their early stages.

However, when any drive exceeds the WL-1 threshold, the process designates that drive as the "target drive" and start intentionally stressing that drive with a higher write workload to accelerate its wear-out process compared to the other drives. This can be achieved various ways. For example, the system may exchange the spare slices on the target drive with write-hot slices from other drives, effectively placing more data on the target drive. As another example, the system may exchange some cold slices on the target drive with write-hot slices from other drives, thereby increasing the write workload on the target drive.

Subsequently, the system monitors the wear deviation between the target drive and the other drives on a routine basis (e.g., daily). Once the minimum deviation between the target drive and the others reaches a predefined threshold WL-2 (e.g., 1%), the system reverts (or undoes) the layout changes made earlier thereby decreasing the write workload on the target drive. The WL-2 threshold is intended to provide enough time to complete the replacement of the first failed drive before the second drive fails.

Accordingly, the target drive is expected to fail first due to its higher wear level compared to the others. If there is a delay in the replacement of the failed drive for an extended period (e.g., 2 weeks), the system may impose a remedial activity. For example, the system may automatically enter into a read-only mode.

Along the lines explained above, it should be appreciated that the system may initially evenly distribute data across all SSDs, ensuring consistent and optimal performance. However, this approach leads to the SSDs wearing out at a uniform rate. As a result, there is an increased likelihood of encountering multiple drive failures simultaneously as the SSDs reach the end of their lifespan. If this situation is not addressed, there may be an increase in storage equipment escalations/predicaments.

To address this issue, new techniques are disclosed herein that aim to avoid having more than N simultaneous drive failures, where N is the RAID tolerance level. Along these lines, an objective is to intentionally wear out N drives faster than the others. This way, the system can proactively manage drive failures and save customers from potential data loss.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, the above-described techniques may be employed to provide even write workloads on SSDs 310 while the SSDs are in their early stages. Along these lines, while the SSDs 310 have wear levels below the early/late stage wear-level threshold, the specialized circuitry may monitor wear level deviation among (or between) the SSDs 310. If the deviation between any two SSDs 310 exceeds a predefined deviation threshold (e.g., a maximum wear level deviation threshold such as 4%, 5%, etc.) while the SSDs 310 are in their early stages, the specialized circuitry selects the less worn SSD 310 as the target SSD 310 and accelerates the wear process on the target SSD 310 as described above (e.g., see FIG. 3).

In some arrangements, the deviation is monitored routinely (e.g., daily) and the specialized circuitry stops the accelerated wear process (e.g., see FIG. 4) when the deviation between the two SSDs 310 comes down to another predefined deviation threshold (e.g., a within-tolerance wear level deviation threshold such as 2%, 3%, etc.).

In some arrangements, the within-tolerance wear level deviation threshold (e.g., 3%) is lower than the maximum wear level deviation threshold (e.g., 5%) to avoid bouncing. Such modifications and enhancements are intended to belong to various embodiments of the disclosure.

What is claimed is:

1. A method of managing solid state device (SSD) wear-level, the method comprising:
   storing data on a plurality of SSDs in an ongoing manner during an early stage of use, a later stage of use, and a nearing-end-of-life stage of use;
   evenly distributing writing workload across the plurality of SSDs during the early stage of use;
   detecting a late stage wear level event in which a wear level of one of the plurality of SSDs exceeds a predefined late stage wear level threshold, the late stage wear level event denoting a transition of the plurality of SSDs from the early stage of use to the later stage of use;
   based on storing the data on the plurality of SSDs and in response to detection of the late stage wear level event, identifying a particular SSD of the plurality of SSDs as a target SSD;
   moving write-hot data to the particular SSD identified as the target SSD to increase writing workload on the particular SSD compared to respective writing workloads on other SSDs of the plurality of SSDs in order to accelerate wear of the particular SSD relative to the other SSDs;
   detecting a nearing-end-of-life wear level event in which a wear level of the particular SSD exceeds a predefined nearing-end-of-life wear level threshold, the nearing-end-of-life wear level event denoting a transition of the plurality of SSDs from the later stage of use to the nearing-end-of-life stage of use; and
   in response to detection of the nearing-end-of-life wear level event, decreasing an amount of write-hot data on the particular SSD to no longer accelerate wear of the particular SSD relative to the other SSDs.

2. The method of claim 1 wherein identifying the particular SSD as the target SSD includes:

selecting the particular SSD among the plurality of SSDs due to the particular SSD having the most aging among the plurality of SSDs.

3. The method of claim 1, further comprising:

prior to storing the data on the plurality of SSDs, reserving a plurality of spare storage slices of the plurality of SSDs for possible data recovery; and wherein moving the write-hot data to the particular SSD includes:

identifying a set of spare storage slices on the particular SSD;

identifying a set of write-hot data slices on another SSD; and relocating the identified set of write-hot data slices from the other SSD onto the identified set of spare storage slices on the particular SSD.

4. The method of claim 3 wherein, after the identified set of spare storage slices is relocated on the particular SSD, the identified set of spare storage slices is no longer usable for data recovery; and wherein decreasing the amount of write-hot data on the particular SSD includes:

removing data from the identified set of spare storage slices on the particular SSD; and re-designating the identified set of spare storage slices on the particular SSD as usable for data recovery.

5. The method of claim 1, wherein detecting the nearing-end-of-life wear-level event in which the wear level of the particular SSD exceeds the predefined nearing-end-of-life wear-level threshold includes:

computing wear level differences between the particular SSD and the other SSDs of the plurality of SSDs.

6. The method of claim 5 wherein the predefined nearing-end-of-life wear level threshold is a predefined wear acceleration termination threshold; and wherein decreasing the amount of write-hot data on the particular SSD includes:

in response to one of the computed wear level differences between the particular SSD and the other SSD of the plurality of SSDs exceeding the predefined wear acceleration termination threshold, removing the write-hot data from the particular SSD to reduce writing workload on the particular SSD.

7. The method of claim 1 wherein evenly distributing writing workload across the plurality of SSDs includes:

while wear levels of all of the SSDs of the plurality of SSDs are initially below the predefined late stage wear level threshold, computing wear level differences among the SSDs of the plurality of SSDs.

8. The method of claim 7 wherein the predefined late stage wear level threshold is a predefined wear acceleration initiation threshold; and wherein detecting the late stage wear-level event in which the wear level of one of the plurality of SSDs exceeds the predefined late stage wear-level threshold includes:

detecting an SSD deviation event in which a wear level difference between the particular SSD and another SSD of the plurality of SSDs has become greater than the predefined wear acceleration initiation threshold.

9. The method of claim 8 wherein identifying the particular SSD as the target SSD includes:

selecting the particular SSD among the plurality of SSDs due to the particular SSD having the least aging among the plurality of SSDs.

10. The method of claim 8, further comprising:

prior to storing the data on the plurality of SSDs, reserving a plurality of spare storage slices of the plurality of SSDs for possible data recovery; and wherein moving the write-hot data to the particular SSD includes:

identifying a set of spare storage slices on the particular SSD;

identifying a set of write-hot data slices on another SSD; and relocating the identified set of write-hot data slices from the other SSD onto the identified set of spare storage slices on the particular SSD.

11. The method of claim 10 wherein, after the identified set of spare storage slices is relocated on the particular SSD, the identified set of spare storage slices is no longer usable for data recovery; and wherein decreasing the amount of write-hot data on the particular SSD includes:

removing data from the identified set of spare storage slices on the particular SSD; and re-designating the identified set of spare storage slices on the particular SSD as usable for data recovery.

12. The method of claim 8, wherein detecting the nearing-end-of-life wear-level event in which the wear level of the particular SSD exceeds the predefined nearing-end-of-life wear-level threshold includes:

computing further wear level differences between the particular SSD and the other SSDs of the plurality of SSDs.

13. The method of claim 12, wherein the predefined nearing-end-of-life wear level threshold is a predefined wear acceleration termination threshold; and wherein decreasing the amount of write-hot data on the particular SSD includes:

in response to one of the computed further wear level differences between the particular SSD and the other SSD of the plurality of SSDs exceeding the predefined wear acceleration termination threshold, removing the write-hot data from the particular SSD to reduce writing workload on the particular SSD.

14. The method of claim 1, further comprising:

prior to storing the data on the plurality of SSDs, setting a value for the predefined nearing-end-of-life wear level threshold based on a prespecified amount of time between the target SSD reaching end of life and a next SSD of the plurality of SSDs reaching end of life.

15. The method of claim 14, further comprising:

in response to detection of the nearing-end-of-life wear level event, providing a notification to the user that target SSD requires replacement.

16. The method of claim 14, further comprising:

in response to detection of the nearing-end-of-life wear level event, starting a timer which is constructed and arranged to expire after a budgeted amount of remaining time elapses without the target SSD being replaced, the budgeted amount of remaining time being less than the prespecified amount of time.

17. The method of claim 16, further comprising:

in response to expiration of the timer, transitioning at least one of the plurality of SSDs to a read-only mode.

18. The method of claim 1 wherein evenly distributing the writing workload across the plurality of SSDs during the early stage of use includes:

in response to a deviation between two SSDs of the plurality of SSDs exceeding a predefined maximum deviation threshold during the early stage of use, accelerating wear on one of the two SSDs that is less worn until the deviation between the two SSDs is below a within-tolerance threshold; and wherein the method further comprises:

prior to storing the data on the plurality of SSDs, setting the within-tolerance threshold to be lower than the predefined maximum deviation threshold by a specified amount to prevent bouncing when evenly distributing the writing workload across the plurality of SSDs during the early stage of use.

19. Data storage equipment, comprising:

memory; and control circuitry coupled to the memory, the memory storing instructions which, when carried out by the control circuitry, cause the control circuitry to perform a method of:

storing data on a plurality of solid state devices (SSDs) in an ongoing manner during an early stage of use, a later stage of use, and a nearing-end-of-life stage of use, evenly distributing writing workload across the plurality of SSDs during the early stage of use;

detecting a late stage wear level event in which a wear level of one of the plurality of SSDs exceeds a predefined late stage wear level threshold, the late stage wear level event denoting a transition of the plurality of SSDs from the early stage of use to the later stage of use;

based on storing the data on the plurality of SSDs and in response to detection of the late stage wear level event, identifying a particular SSD of the plurality of SSDs as a target SSD, moving write-hot data to the particular SSD identified as the target SSD to increase writing workload on the particular SSD compared to respective writing workloads on other SSDs of the plurality of SSDs in order to accelerate wear of the particular SSD relative to the other SSDs;

detecting a nearing-end-of-life wear level event in which a wear level of the particular SSD exceeds a predefined nearing-end-of-life wear level threshold, the nearing-end-of-life wear level event denoting a transition of the plurality of SSDs from the later stage of use to the nearing-end-of-life stage of use; and in response to detection of the nearing-end-of-life wear level event, decreasing an amount of write-hot data on the particular SSD to no longer accelerate wear of the particular SSD relative to the other SSDs.

20. A computer program product having a non-transitory computer readable medium which stores a set of instructions to manage solid state device (SSD) wear-level; the set of instructions, when carried out by computerized circuitry, causing the computerized circuitry to perform a method of:

storing data on a plurality of SSDs in an ongoing manner during an early stage of use, a later stage of use, and a nearing-end-of-life stage of use;

evenly distributing writing workload across the plurality of SSDs during the early stage of use;

detecting a late stage wear level event in which a wear level of one of the plurality of SSDs exceeds a predefined late stage wear level threshold, the late stage wear level event denoting a transition of the plurality of SSDs from the early stage of use to the later stage of use;

based on storing the data on the plurality of SSDs and in response to detection of the late stage wear level event, identifying a particular SSD of the plurality of SSDs as a target SSD;

moving write-hot data to the particular SSD identified as the target SSD to increase writing workload on the particular SSD compared to respective writing workloads on other SSDs of the plurality of SSDs in order to accelerate wear of the particular SSD relative to the other SSDs;

detecting a nearing-end-of-life wear level event in which a wear level of the particular SSD exceeds a predefined nearing-end-of-life wear level threshold, the nearing-end-of-life wear level event denoting a transition of the plurality of SSDs from the later stage of use to the nearing-end-of-life stage of use; and in response to detection of the nearing-end-of-life wear level event, decreasing an amount of write-hot data on the particular SSD to no longer accelerate wear of the particular SSD relative to the other SSDs.

\* \* \* \* \*